UNITED STATES PATENT OFFICE.

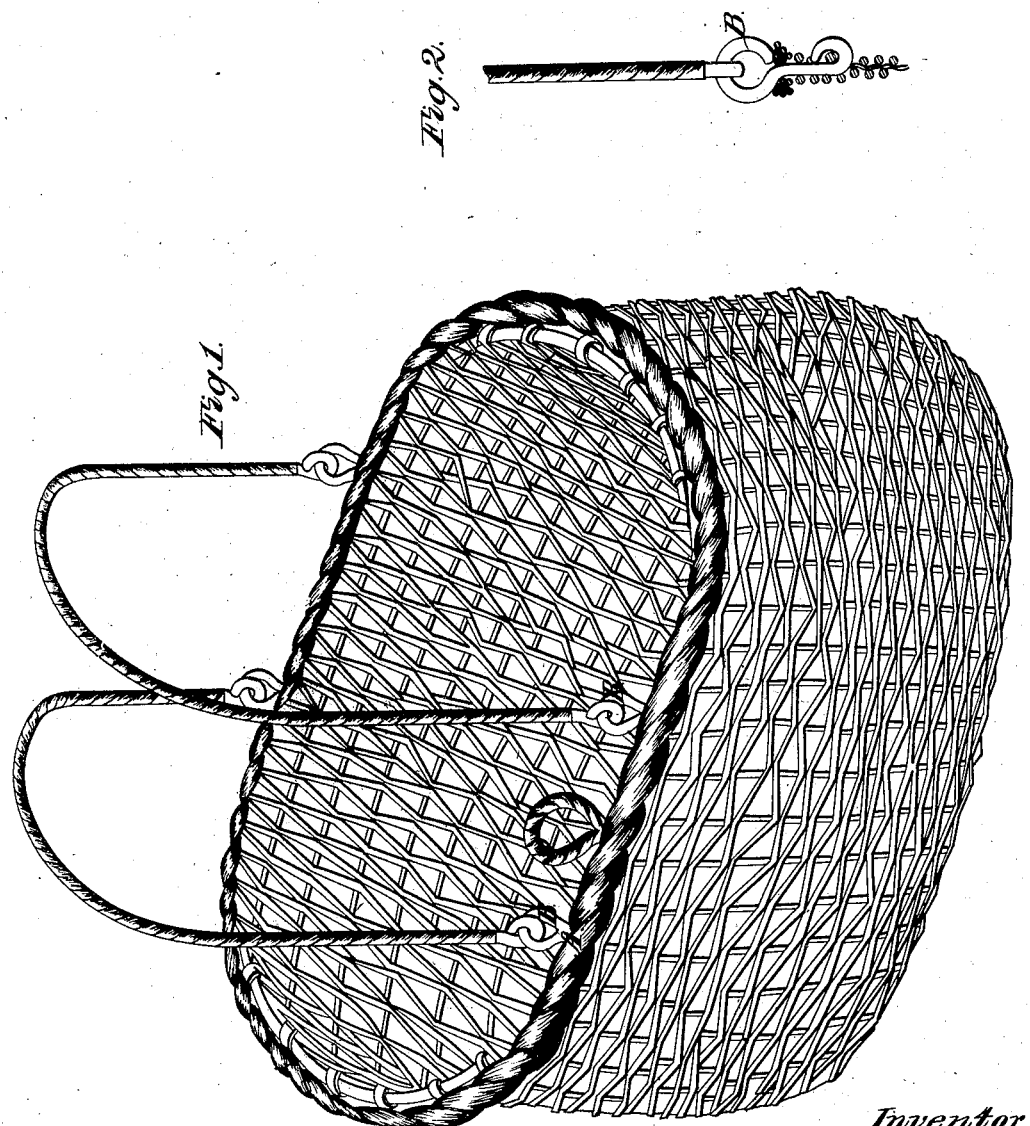

THOMAS HEGARTY, OF ST. LOUIS, MISSOURI.

IMPROVEMENT IN THE MANUFACTURE OF BASKETS.

Specification forming part of Letters Patent No. 31,119, dated January 15, 1861.

*To all whom it may concern:*

Be it known that I, THOMAS HEGARTY, of the city and county of St. Louis, and State of Missouri, have invented a new and useful Improvement in the Manufacture of Baskets; and I do hereby declare that the following is a full, clear, and exact description of the same, reference being had to the annexed drawings, making part of this specification, in which—

Figure 1 is a perspective view of one of my baskets, and Fig. 2 a part to be hereinafter explained.

The object of my invention is to cheapen the price of fancy baskets and add to their durability. This object I effect by the use of a new material in the manufacture of baskets, which new material consists of broom-corn whisks and wire, which I interweave with willow or rattan, so as to make a very cheap and durable basket.

I make my baskets in any of the known forms; but instead of using willow for the stakes to form the wall of the basket I use the whisk of broom-corn. I first make the bottom of the basket in the ordinary way, and at each quarter of the bottom I interweave two willow stakes. The rest of the stakes I make of the whisks of broom-corn, the butts of which I interweave in the bottom.

The object in using willow stakes at each quarter of the basket is to stiffen the wall thereof.

In making the basket I leave the bushy ends of the whisks whole, and after the wall of the basket has been made I twist these bushy tops into a rope or border around the upper edge of the wall of the basket, as shown by A. The basket having been thus made, I make metal hinge-loops B B and introduce them in the wall of the basket, down through the border A, and clinch the lower end in the wall. Into these loops I hook the handle of the basket, which I also make of wire, and wrap it with willow or rattan. The lid of the basket I also secure with wire hinges in a manner similar to the handle.

I claim as my invention—

The use of broom-corn and wire, in combination with willow or rattan, substantially in the manner described, for the purpose of making a cheaper and more durable basket than can be made of willow or rattan.

THOMAS HEGARTY.

Witnesses:
C. E. GRAY,
R. G. B. GRAY.